(No Model.)
C. MINER.
DRAFT EQUALIZER.
No. 319,600. Patented June 9, 1885.
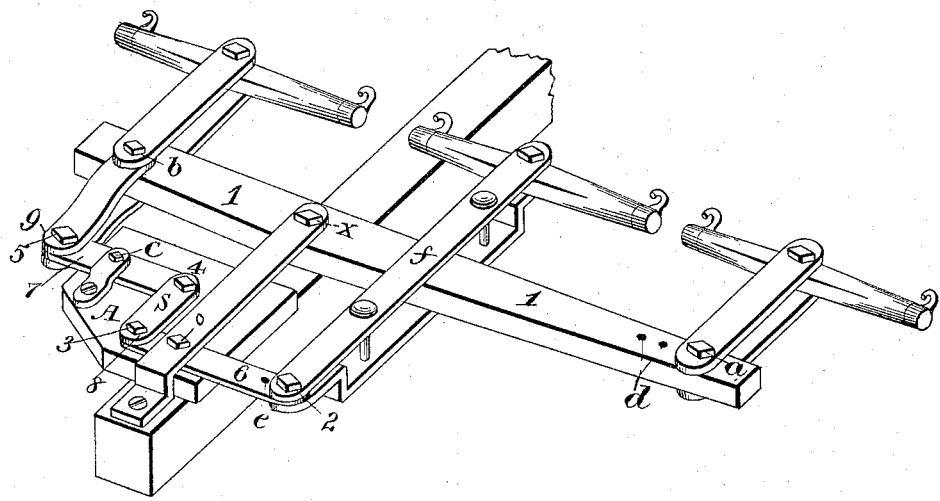
Witnesses:
J. C. Hisey
A. L. Goodrich
Inventor:
Constantine Miner
Enoch Myers
atty

UNITED STATES PATENT OFFICE.

CONSTANTINE MINER, OF ROCHESTER, INDIANA.

DRAFT-EQUALIZER.

SPECIFICATION forming part of Letters Patent No. 319,600, dated June 9, 1885.

Application filed December 10, 1884. (No model.)

*To all whom it may concern:*

Be it known that I, CONSTANTINE MINER, a citizen of the United States, residing at Rochester, in the county of Fulton and State of Indiana, have invented a new and useful Three-Horse Evener, of which the following is a specification.

My invention relates to improvements in the manner of attaching the animals to all tongued farm machinery requiring the power of three horses. Its objects are, first, to secure a direct center draft on the tongue between the middle and left-hand animal, thus avoiding the objectionable side draft produced by other appliances of this kind; second, to obviate the necessity for a short double-tree commonly used with three-horse eveners; and, third, to distribute the draft with exact equality among the animals attached, or (if the animals be of unequal strength) to distribute the draft in exact proportion to their strength, and at the same time give to the animals greater freedom of movement than is attainable in the use of other contrivances of this class. I attain these objects by means of the mechanism illustrated in the drawing, showing a perspective view of my device.

In said drawing, 1 1 represent the double-tree, which is five (5) feet in length from $a$ to $b$, eighteen (18) inches of which is to the left and forty-two (42) inches to the right of the main draft-bolt X, passing through the double-tree and tongue. At this point the draft is centered, and here the joint power of all the animals is applied. The single-trees are each twenty-six (26) inches in length, and so attached by means of band-iron (one and three-fourths inch wide by one-eighth inch in thickness) at $a$, $b$, 2, and 5 that when the animals are drawing equally they stand in a lateral right line. The middle horse is attached at 2 by means of two pieces of band-iron, as aforesaid, one above and one below the double-tree, which moves freely backward or forward between them, as shown at $f$.

Observe that in the division of the double-tree the right-hand animal is given an advantage of six (6) inches over and above what is by the common rule allowed—that is, six (6) inches more than twice the length given to the other animals. In all other three-horse eveners (where a short double-tree is used) the horse operating by himself and against the other two is given exactly two-thirds (⅔) of the long double-tree. I depart from this rule in order to give room for the single-trees in case this animal should prove too strong for his mates and it becomes desirable to increase his draft by attaching him at $d$. Supposing the horses to be of equal strength, however, the advantage given to the right-hand animal in the division of the double-tree, as above stated, is overcome by the two equalizers situated in the rear of the double-tree, as shown in the drawing, (6 and 7.) These equalizers are made of iron two (2) inches in width and three-eighths (⅜) inch in thickness. 6 represents the long equalizer, which is twenty (20) inches in length, fifteen (15) inches to the right and five (5) inches to the left of the fulcrum-pin, shown in the drawing to the left of the figure 6 and directly behind X, with which it is connected by iron of the width and thickness last above stated. The short equalizer 7 is thirteen (13) inches in length, eight (8) inches to the left and five (5) inches to the right of $c$, which is another fulcrum-pin passing through the fulcrum-board A. The movable coupling S connects the short ends of the two equalizers and moves freely backward or forward on the fulcrum-board, according to the power applied at 2 or 5. The fulcrum-board A, above mentioned, is made of wood one and one-half (1½) inch in thickness, is firmly bolted to the tongue, and affords a means of attaching the short equalizer at $c$.

From the foregoing it will readily appear that when the middle horse moves forward (being attached at 2) the movable coupling S will break back in the direction of the figure 8, and that at the same time the long end of the short equalizer will move forward at 9. Now, the left-hand animal being attached at $b$ and also at 5 by means of continuous pieces of iron, as at $f$, when the middle horse applies his power at 2 it operates directly to the assistance of the left-hand animal at 5. So that the middle and left-hand animals apply their joint power at $b$ to balance the power of the right-hand animal applied at $a$. It will likewise appear that the advantage given the right-hand animal in the division of the double-tree is overcome by a like advantage given to the middle horse in the equalizers above explained.

I have already shown that in case the right-hand animal should prove too strong for his mates, his draft can readily be increased by attaching him at $d$; so, also, if he prove not strong enough his point of attachment may be moved still farther to the right of $a$; but should the middle animal prove too strong, increase his draft by attaching him at $e$. With these means provided the draft can be apportioned with exact equality among the animals, if desired, and if not then apportioned according to the strength of the animals used.

What I claim as my invention, and desire to secure by Letters Patent, is—

1. The combination, in a draft-equalizer, of a double-tree, a single-tree pivotally connected at opposite ends thereof, and an intermediate single-tree connected with one of the lateral single-trees by means of the movable block A and the arms 6 and 7 and connection S, substantially as specified.

2. The combination, with the draft-pole and double-tree, of the single-trees, the bars 6 and 7, connected by the plate S, the bar $f$, connecting the intermediate single-tree with the bar 6, the bar 9, connecting the outer end of the bar 7 with the short end of the double-tree, the bar X, and the movable bar A, all adapted to operate substantially as specified.

CONSTANTINE MINER.

Witnesses:
 JOHN C. HISEY,
 ALFRED L. GOODRICH.